United States Patent [19]

Rudy et al.

[11] 4,193,685
[45] Mar. 18, 1980

[54] FIXED MESSAGE CARRIER

[75] Inventors: Michael W. Rudy, Thousand Oaks; Edward J. Kramer, Canoga Park; Martin M. Bondar, Northridge; Ronald L. Whitney, Reseda, all of Calif.

[73] Assignee: Terminal Data Corporation, Woodland Hills, Calif.

[21] Appl. No.: 25,430

[22] Filed: Mar. 30, 1979

[51] Int. Cl.² ............................................. G03B 27/52
[52] U.S. Cl. ............................. 355/41; 242/67.4; 271/3; 355/23; 355/75
[58] Field of Search .............. 355/23, 75, 41; 271/3; 242/67.3 R, 67.4

[56] References Cited

U.S. PATENT DOCUMENTS

| | | | |
|---|---|---|---|
| 3,288,025 | 11/1966 | Litz et al. | 355/41 |
| 3,679,304 | 7/1972 | Eng | 355/41 |
| 3,862,802 | 1/1975 | Till | 271/3 X |
| 3,922,084 | 11/1975 | Burton et al. | 355/41 |
| 3,988,062 | 10/1976 | Burton et al. | 355/23 |
| 4,026,646 | 5/1977 | Ritzerfeld | 355/75 X |
| 4,027,870 | 6/1977 | Frech et al. | 355/23 X |
| 4,050,816 | 9/1977 | Stemmle | 355/75 |
| 4,052,128 | 10/1977 | Burton et al. | 355/23 X |
| 4,053,224 | 10/1977 | Burkard et al. | 355/23 X |
| 4,080,063 | 3/1978 | Stemmle | 355/75 X |

Primary Examiner—Richard A. Wintercorn
Attorney, Agent, or Firm—Harry R. Lubcke

[57] ABSTRACT

Apparatus for selectively, typically repetitively, moving a fixed message document to and from a photographing position on a document camera system. Logic control means on a fixed messsage carrier apparatus coact with system-operating means and transport means of the camera system to control the to and from movement. Any selected fixed message document can be handled. It is removably stored between flexible belts and cylindrical means that are in peripheral contact, and is unwound therefrom to the photographing position, and vice versa.

12 Claims, 4 Drawing Figures

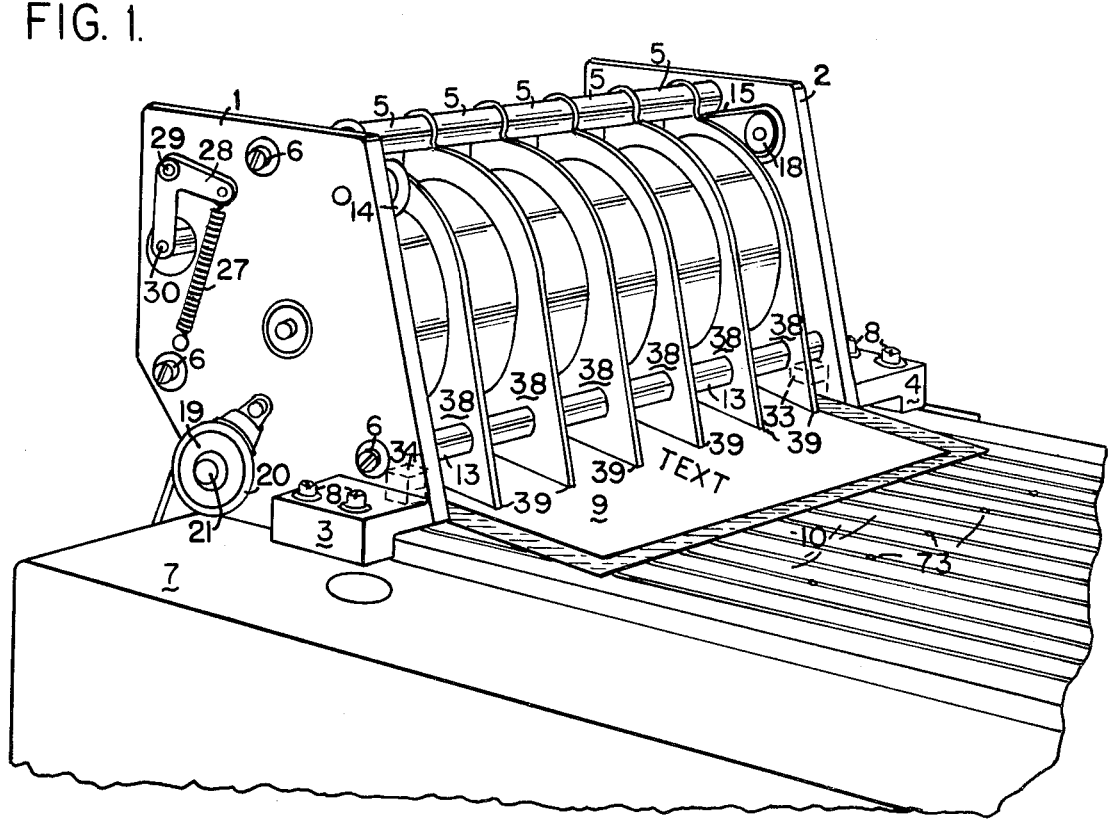

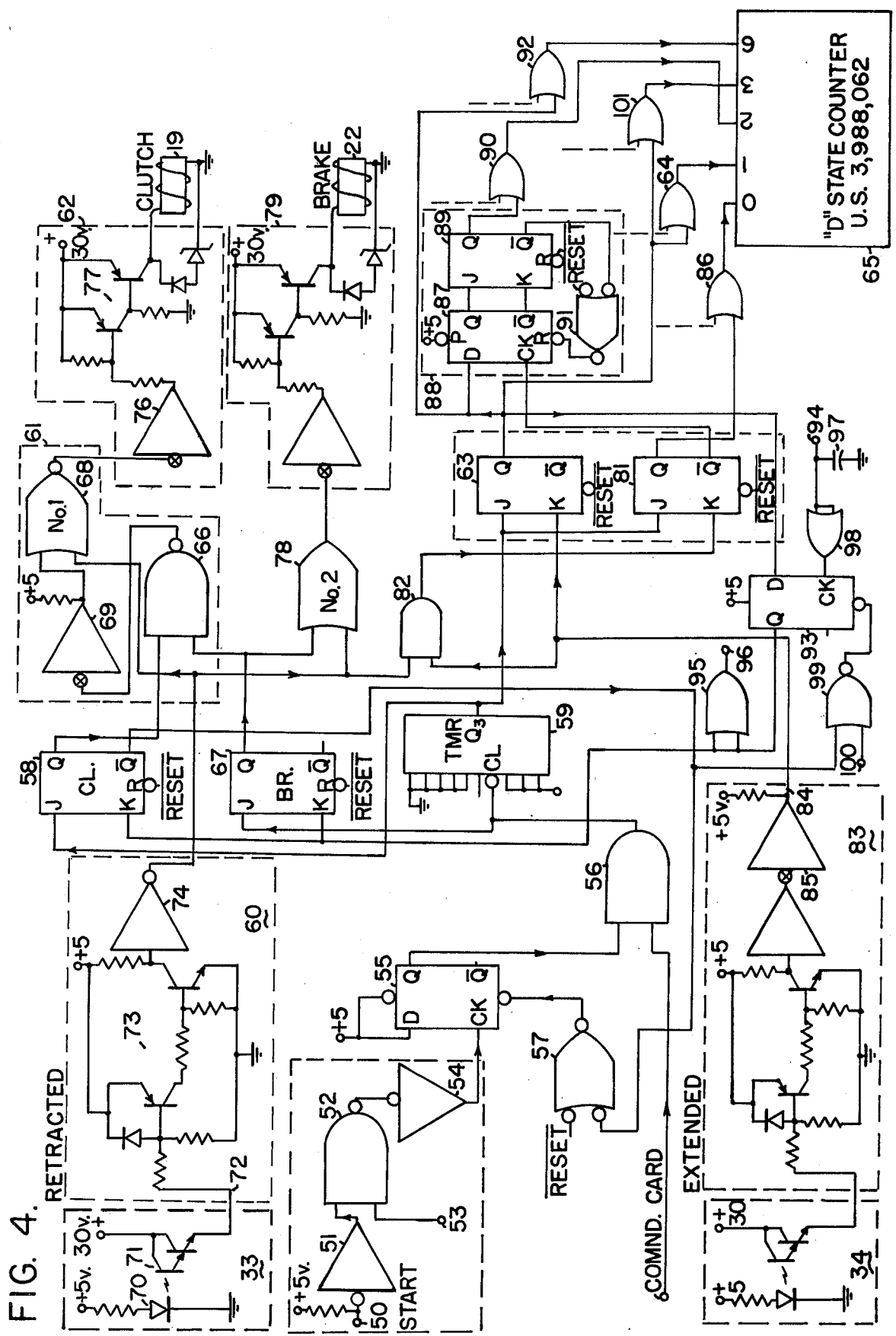

FIXED MESSAGE CARRIER

BACKGROUND OF THE INVENTION

This invention pertains to translational transport means for documents, as related to a camera system.

The U.S. Pat. No. 3,988,062, to Burton and Whitney, entitled, "Two-Sided Document Recorder", granted Oct. 26, 1976, provides a document camera system to which the present fixed message carrier apparatus can be attached. The patent provides a system of flexible-belt vacuum-table logic elements to accept many documents, one after the other, and successively microphotographs one or both sides of these documents.

Early prior art employed different means to accomplish the transport of documents. Such art is set forth in the "Background" of U.S. Pat. No. 3,988,062, while information is incorporated herein by reference.

Additionally, the U.S. Pat. No. 4,027,870, to Frech and Bondar, granted June 7, 1977, entitled, "End for End Document Inverter", discloses a different attachment to the above identified "Two-Sided Document Recorder". Documents sequentially pass between a drum and partially surrounding belts; entering at one point and being discharged at another point around the periphery of the assembly.

The U.S. Pat. No. 3,862,802, to Till, granted Jan. 28, 1975, entitled, "Sheet Reversing Apparatus and a Duplex Reproducing Apparatus Employing Same", discloses storing means comprising a web wherein the sheets are supported between adjacent layers. The purpose is to turn the sheets over so that both sides can be printed upon.

BRIEF SUMMARY OF THE INVENTION

A fixed message document is reversibly retained between plural flexible belts and correspondingly spaced plural cylinders.

Coactive with the host camera system logic, upon cue, the cylinders are caused to synchronously revolve by the engagement of a clutch, such that the fixed message document emerges from the fixed message carrier apparatus. The fixed message document is accepted by the multiple belts of the vacuum table of the host document camera system. These are moving in the reverse direction to carry the fixed message document to the position for photographing by the camera of the document camera system.

Photographing having been accomplished, the logic provided reverses the movement on both the document camera system and the fixed message carrier, so that the fixed message document is retracted into the fixed message carrier apparatus.

Then, photographing of other documents by the document camera system alone can take place as long as desired.

When another photograph of the fixed message document, which may be a resolution chart, is desired, this is again accomplished under logic control.

BRIEF DESCRIPTION OF THE DRAWINGS

FIG. 1 shows the fixed message carrier in perspective side elevation and significant adjacent elements of the document camera system. A fixed message document is half-emerged from the apparatus.

FIG. 2 shows the same in schematic side elevation.

FIG. 3 shows the detail of a fixed message document, including the control slots.

FIG. 4 shows the logic of the fixed message carrier and such logic as it interfaces in the document camera system. The logic circuits are detailed.

DESCRIPTION OF THE PREFERRED EMBODIMENTS

In FIG. 1, numeral 1 identifies the front end plate of the fixed message carrier apparatus, while numeral 2 identifies the rear end plate. These plates are fastened together in parallel planes by suitable means, such as a rod internal to sleeves 5, which rod is fastened to the end plate 1 by machine screws 6, and similarly at end plate 2, that screw not seen in FIG. 1.

The end plates are further fastened together by a lower forward rod 13, which is fastened by further machine screws 6. Also, with a third rod at the rear of the plates, not seen, which is similarly fastened with further machine screws 6. The screw in plate 1 is seen.

Plate 1 has a foot 3 and plate 2 a foot 4. These feet rest upon table 7 of the previously mentioned "Two-Sided Document Recorder", U.S. Pat. No. 3,988,062, of common assignee. Cap screws 8 are illustrative of means of fastening the feet to the table.

Fixed message document 9 is shown in FIGS. 1, 2, and 3. This may take the form of a resolution chart, having variously closely spaced lines and other symbols for testing the precision of the microfilm or microfiche image that has been photographed with the camera of the previously mentioned patent. In the illustrations herein the lines and symbols are represented by the word "TEXT", and may occupy all of the clear area shown in FIG. 3.

Alternately, the "TEXT" may consist of a title sheet or any other document that typically is used more than once in an operative run of a number of other documents through the document recorder disclosed in the previously mentioned patent.

The essential structure of the fixed image carrier apparatus is shown in the side elevation schematic mechanical showing of FIG. 2.

Element 11 is one of typically two plural cylindrical means; one is disposed adjacent to end plate 1 and the other is disposed adjacent to end plate 2. These are on the inner side of each end plate and thus are not seen in FIG. 1. These cylindrical means are mounted on common shaft 12 and this provides synchronous motion of them. Each carries a relatively thin belt, 14 and 15, respectively, around approximately the rear half of the circumference of each.

Each belt is also supported with three small pulleys; drive pulley 16 at the bottom, tension pulley at the rear, 17, and idler pulley 18 at the top.

The size of the apparatus as a whole and the diameters of these elements are amenable to significant variation, as need may dictate. In an illustrative example, cylinder 11 is 12 cm in diameter, while each of the small pulleys are 2.5 cm in diameter. Belts 14 and 15 are each approximately 1 cm wide and the axial extent of each cylinder 11 is approximately 1.3 cm.

Drive pulley 16 is provided with an electrically actuated clutch 19, which selectively connects power-receiving pulley 20 to shaft 21. This shaft extends the full width of the fixed message carrier apparatus in order to carry a duplicate of belt drive pulley 16 that is adjacent to rear end plate 2, and also to carry an electrically actuated brake 22 on the outside of plate 2.

Power is transmitted to drive pulley 16 by belt 23, which may be of the toothed timing-belt type. It also wraps around pulley 24, which is mounted on shaft 25. This is the shaft that supports belt roller 48 in the previously mentioned U.S. Pat. No. 3,988,062. Belt 10, shown in the present FIGS. 1 and 2, is also from that patent.

In practice, entity 10 is preferably comprised of a plurality of narrow belts, say fourteen. This allows effective functioning of plural vacuum sensors 73, which are represented by holes located between certain of the narrow belts.

The period and the direction of the motion of belts 10 is under the control of the logic apparatus shown in FIGS. 7 and 8 of U.S. Pat. No. 3,988,062 and as rectangle 31 of FIG. 2 herein.

The logic of this fixed message carrier apparatus is shown in FIG. 4 and rectangle 40 in FIG. 2, herein. It interfaces with that of the patent to actuate clutch 19 and brake 22.

In addition to the vacuum sensors previously mentioned, main table 7 is provided with many small holes (not shown) between belts 10, so that a document will be pressed downward by atmospheric pressure and so carried along when the belts are in motion. A vacuum is maintained in the small holes.

As soon as fixed message document 9 is rolled out, even in part as shown in FIGS. 1 and 2, the vacuum drive previously mentioned is effective upon it. Thus, the overall action upon the document is one of pull and push, respectively. Belt 14 is tightly held to cylinder 11 by the tension exerted on the belt by tension pulley 17.

In FIG. 2 the tension element is simply shown as spring 27, which is fastened at the left to stationary element 1. In FIG. 1 the effect is the same for the same elements.

In FIG. 2, pulleys 18 and 16 are stationarily positioned insofar as a force exerted radially with respect to cylinder 11 is concerned, and so the tension exerted upon pulley 17 tightens the whole of belt 14.

In FIG. 1 the tension of spring 27 is transmitted through angle arm 28, which arm has a central fulcrum at pin 29. The right extremity of the arm is attached to spring 27. The left lower extremity of the arm is attached to shaft 30 of pulley 17.

It is seen that the tension that spring 27 exerts causes shaft 30 to move to the left as far as the length of belt 14 will allow, thereby stretching it taut.

An equivalent structure upon end plate 2 keeps belt 15 taut.

Cylinders 11 are free-rolling. They are driven by belts 14 and 15, respectively.

Document 9 is wrapped less, or more than, one circumference around the two cylinders 11 underneath belts 14 and 15. Note FIG. 2, in which the document is illustrated with long dashed lines to make identification easy.

In FIG. 2 document 9 is part of the way out of the fixed message carrier and is about to be secured to belts 10 by the vacuum under the same. This direction of motion continues until the document no longer covers vacuum sensors 73.

This functioning is accomplished with the aid of plural slots 32, say five. These are seen in the full flat illustration of document 9 in FIG. 3.

When the document has moved sufficiently far to the right in FIG. 1 so that each of the slots 32 uncovers a vacuum sensor 73, then the logic of the main host apparatus is given a signal to stop the translation of belts 10 to the right and the "TEXT" of document 9 lies just to the right of the sensors.

This is accomplished by sensor 34 encountering aperture 35 on the fixed message document in the fixed message carrier apparatus.

Belts 10 are then reversed on the main apparatus and move document 9 slightly to the left, as though it were an ordinary document being positioned for photography. The only difference therefrom is that the fixed message document has excess material to the left of the text, but the slots allow the main apparatus to ignore this material.

The fixed message document is now in the photographing position of the host document camera system. Host logic 31 thus accomplishes photographing, and belts 10 then move to the left and the fixed message document is wound back on cylinders 11.

A dark border has been shown (shading, for reproduction reasons) surrounding the "TEXT" area of the fixed message document. This is to give a uniform border to the microfilm or microfiche image. Whether or not this is provided is optional.

A preferred material for the fixed message document is polyethylene terephthalate, manufactured as "Mylar" (DuPont), and having a thickness of approximately 0.2 milimeter.

It may have a photographic emulsion and resolution target markings, or other text, that is accomplished photographically. Other photographic means are employed, that are not a part of this invention.

An $8\frac{1}{2}" \times 11"$ (21.5×28 cm) size is usual, since this is the size of the usual document that is microphotographed.

One fixed message document can be exchanged for another by merely removing the one from between the belts and the cylinders, and replacing it with another. It is necessary that all such documents have slots 32, so that the document is properly positioned for photographing, as has been explained.

It is possible to utilize fixed message documents of larger size, such as $11" \times 17"$ (28×43 cm). Such a document is merely wrapped around cylinders 11 under the belts more than once. The document is provided with more than one set of slots 32 if it is to halt more than once in the photographing thereof.

In view of the push-pull nature of the feed for the fixed message documents in passing from drums 11 and belts 10 of table 7, and vice versa, ordinary thickness of ordinary paper can be utilized for fixed message documents and the paper will not crumple.

The control of the motion of the fixed message document is further accomplished by sensors 33 and 34, and typically two apertures 35 and 36 located in the margins of the fixed message document.

The sensors may be opto-photoelectric; i.e., a small source of light disposed upon one side of the document and a small photoelectric device directly opposite the source of light on the other side of the document. The sensors thus typically have a "U" shape that extends over both sides of the document.

Rear aperture 35, in coaction with sensor 34, provides an electrical pulse when the fixed message document is essentially fully reeled out. This pulse signal is conveyed to logic 31 of the host apparatus for the purpose of reversing the motion of belts 10 from translating in the reverse direction to translating in the forward direction. The forward direction is the normal direction of motion with a usual document being processed by the document camera system alone. In the present instance the fixed message document then translates forward a small distance until stopped by vacuum sensors 73, which places the document in the photographing position.

Forward aperture, or notch, 36 provides a pulse upon the return of the fixed message document to its home position; i.e., around cylinders 11. This is a signal to disconnect clutch 19 and apply brake 22. Logic 40 of the fixed message carrier apparatus accordingly ceases power energization of the clutch and starts power energization of the brake. The result is that the fixed message document always rewinds to approximately the same position.

Aperture-notch 36 at the upper forward corner of the fixed message document as shown in FIG. 3 performs two functions. When the fixed message document is out upon belts 10, sensor 33 is not energized. This is because notch 36 is out beyond sensor 33 and the opaque material of the fixed message document is interposed between the light source and the photoelectric parts of the sensor.

Should the operator inadvertently, or of necessity, press the RESET push button on the main document camera system apparatus while the fixed message document is extended the logic of the fixed message carrier apparatus 40 is so informed and so does not apply brake 22. This provides a valuable safety interlock functioning. When the fixed message document is reeled back into the fixed message carrier apparatus the presence of notch 36 at sensor 33 causes clutch 19 to be disengaged and brake 22 to be applied, as is desired.

In order that the fixed message document shall physically roll out properly from the fixed message carrier apparatus, plural guides, say six, 38, are disposed intermediately between end plates 1 and 2. These are secured between the several sleeves 5, at the top of each guide. They are also secured at the bottom, front and back, by the rods that extend between the end plates at the locations of the two lower machine screws on end plate 1 in FIG. 1.

The guides as seen in FIG. 1 are the portions above a slot 39 in each guide, through which document 9 emerges. Coplanarly below each slot is disposed the lower part of each guide. An unobstructed circumferential-to-tangent slot is thus formed. The lower parts are held by the rod at the rear, which is identified in position by the machine screw 6 thereat.

FIG. 4 is a schematic logic diagram of the fixed message carrier apparatus, element 40 in FIG. 2.

A start command signal is accepted at terminal 50 in FIG. 4 to unreel the fixed message document. As embodied, this is a negative pulse, as from plus 5 volts to zero volts. It may have any duration between 10 microseconds and 10 milliseconds. This pulse is inverted by inverter 51 in order to give the correct polarity for the subsequent NAND gate. The inverter may be of the SN7414 type.

The inverter is connected to one input of two-input NAND gate 52, the other input of which is from terminal 53.

Upon terminal 53 is impressed a signal that signifies that a desired situation is obtained on the document camera system, as sensed by the logic means thereof, element 31 in FIG. 2 herein. The situation is typically an electrical representation that there is no other document upon main table 7, i.e., upon belts 10.

When conditions at the input of NAND gate 52 allow an output therefrom that output is then inverted by inverter 54.

The output from inverter 54 is connected to the "CK" input of flip-flop 55. The flip-flop provides a "Q" output, which is connected to one input of AND gate 56. Flip-flop 55 stores the start command pulse for subsequent processing.

Flip-flop 55 is reset by an output from OR gate 57. This returns the flip-flop to its quiescent condition, to be ready for the next start command at terminal 50.

The input to OR gate 57 is from $\overline{RESET}$, which is actuated by a "power on" event, or by a specific push button (not shown).

Another input to OR gate 57 is from the $\overline{Q}$ output of the "clutch energize command" J-K flip-flop 58. When flip-flop 58 is set, flip-flop 55 is no longer required to hold the status of the operation.

When either of these inputs are "go", flip-flop 55 is reset, being thus prepared for the next start command.

The second input of AND gate 56 is from the logic of the previously identified U.S. Pat. No. 3,988,063. This logic can conveniently be actuated by information on a "command card"; that is, a special document inserted in the series of documents to be microphotographed. This apparatus and technology is set forth the the U.S. Pat. No. 3,922,084, to Burton and Whitney, "Controlled Document Recording System", granted Nov. 25, 1975, which is included herein by reference.

Herein, the command card input signifies that there are no other documents on main table 7, and the signal is given when the command card itself is essentially off of the main table.

The output of AND gate 56 enters the CL terminal of "clutch energize delay timer" 59. This delay, of typically 120 milliseconds, is interposed to provide a time interval sufficiently long to allow the electromechanical brake 22 to become completely deenergized before clutch 19 is energized.

The output is taken from the $Q_3$ terminal of timer 59, and is connected to the J terminal of the clutch energize command flip-flop 58.

The Q output of clutch energize flip-flop 58 passes through OR gate 61, clutch amplifier 62, and electrically energizes clutch 19. Thus, when belts 10 are put into motion under the control of document camera logic 31, the fixed message document will be reeled outward, as has been previously explained.

The $Q_3$ output of timer 59 is also connected to "start D state counter" J-K flip-flop 63, to the J input thereof.

The Q output of flip-flop 63 passes through OR gate 101 and thence to the fourth input of the "D state counter" 65, simulating a "17″ sw." condition in the terminology of the host document camera system. The Q output of flip-flop 63 also passes through OR gate 64 and thence to the second input of D state counter 65, simulating a "no flip not" condition for that counter.

An important function of the D state counter herein is to command the main drive transport; i.e., belts 10, to operate in reverse, for moving the fixed message document outward (and vice versa). Logic 31 operates as though side 2 of a usual document was being transported, as set forth in the U.S. Pat. No. 3,988,062.

The drums and belts of the fixed message carrier apparatus are mechanically connected to belts 10 through belt 23 and clutch 19. Thus, the fixed message document will move out to meet synchronously moving belts 10.

Returning to the clutch operative path, OR gate 61 is seen to be comprised of plural elements. It is designated No. 1 OR gate.

One input is to engage clutch 19 to start moving the fixed message document. When it starts moving retracted amplifier 60 latches; i.e., keeps the clutch engaged for the remainder of the cycle.

The Q output of clutch energizing flip-flop 58 enters OR gate No. 1, the assembly 61, through NAND gate 66. The Q output of "brake deenergize command" flip-flop 67 also enters NAND gate 66.

It will be noted that the J input to flip-flop 67 is from the CL input to clutch delay timer 59; i.e., before the delay, while the J input to flip-flop 58, for clutch energizing, is from the $Q_3$ output of delay timer 59; i.e., after the delay, of typically 120 microseconds.

There is time coincidence of both Q outputs after the delay stated; thus, an output from NAND gate 66 is obtained when both flip-flops 58 and 67 are providing an input to that gate. This circuit arrangement prevents the clutch and the brake from being simultaneously engaged.

This output passes to inverter 69, which is inserted in the logic chain that ultimately energizes clutch 19 through clutch amplifier 62.

The output of inverter 69 is connected to one input of OR gate No. 1, element 68, proper. This is to energize clutch 19 if another condition is satisfied.

The other condition has to do with the position of the fixed message document 9, as sensed by retracted sensor 33. This sensor is located at the rear end plate 2 in FIG. 1 and coacts with notch 36 in FIG. 3.

Sensor 33 is comprised of light-emitting diode 70 and photo transistor 71. The former is disposed on one side of the path of the fixed message document, in line with edge notch 36, and the latter is disposed directly oppositely on the other side of the path. The opto-photoelectric sensor 33 may be embodied in the commercially available type GE H13B1.

The electrical output from sensors 33 appears on the emitter of transistor 71, which is connected to the input 72 of dual transistor amplifier 73. The output therefrom is connected to inverter 74. The signal level at the output thereof is sufficient to actuate NOR gate No. 1, typically plus 5 volts.

As long as the fixed message document is retracted; i.e., rolled upon cylinders 11, notch 36 will lie between the light-emitting diode 70 and photoelectric transistor 71, and a zero volt signal will enter NOR gate 68. NOR gate No. 1 is then not enabled.

Shortly after the fixed message carrier apparatus has been commanded to roll out the fixed message document by an input at terminal 50, the opaque margin of document 9 intercepts the light beam from diode 70. This provides an enabling input to No. 1 NOR gate 68, such that clutch 19 is engaged.

The original pulse from terminal 50 is no longer needed, since flip-flop 58 also holds the status until after the photographic exposure is completed, after which time flip-flop 58 is reset. However, phototransistor 71 still holds clutch 19 engaged until the completion of the cycle.

An enabling output thus having been maintained, it passes to clutch amplifier 62. This amplifier may be comprised of an inverter 76 and a power amplifier 77. The latter may have a power output of approximately 8 watts. This is for actuating a typical clutch 19, having a 120 ohm 30 volt d.c. coil. It is a two plate electromechanical device for engaging the drums 11 of the fixed message carrier apparatus to the main host transport 10, 24.

When the fixed message document is rolled within the fixed message carrier and consequently does not enter into the functioning of the host document camera system, brake 22 is "on". This mode of operation provides a safety feature to prevent the fixed message document from rolling out at an improper time.

When the brake deenergize command flip-flop 67 is reset the Q output thereof is zero volts. When notch 36 is the fixed message document allows phototransistor 33 to be illuminated and so to conduct, brake 22 is energized through brake amplifier 79. The output of retracted amplifier 60 from phototransistor 33 is zero volts when the phototransistor conducts and plus 5 volts when it does not conduct.

Brake 22 is to be deenergized just prior to each energization of clutch 19. Deenergization is accomplished by a Q output from brake deenergize command flip-flop 67.

As has been mentioned, flip-flop 67 is energized from the start command pulse, suitably processed, and being impressed upon the J terminal without any time delay.

The output from No. 2 OR gate 78 enters the input of brake amplifier 79. This amplifier is a duplicate of clutch amplifier 62, which was described above. The electrical characteristics of brake 22 are essentially the same as those of clutch 19. The brake may be a type GE H13B1, the same part as the clutch, one plate of the brake being retained stationary. Braking action is thereby obtained.

Certain of the logic elements previously described supply an input to D state counter 65 to instigate actuation thereof so that the necessary purposes of the fixed message carrier apparatus will be accomplished.

Conversely, that counter responds according to the logic performance required of the host document camera system. When the system is free to accept the fixed message document for photographing, such response as is required to manipulate clutch 19 and brake 22 of the fixed message carrier apparatus in a manner to place that document on table 7, and immediately thereafter to handle that document as a usual document that is put through the system for photographing.

Pulley 24 of the host document camera system is not constantly rotating; rather, it rotates only when a document is being translated for photographing by that system. When that document is the fixed message document this also occurs, with the addition of the rotation of cylinders 11 to unwind the document, and vice versa. At this time clutch 19 is engaged to drive the cylinders.

The "start D state counter" entity of FIG. 4 herein is further comprised of J-K flip-flop 81. The J input thereof is fed from the $Q_3$ output of timer 59, the same as the J input of previously described flip-flop 63.

However, the K input is fed from the output of AND gate 82. One input to that gate is from output 84 of "extended photocell amplifier 83". The other input to gate 82 is from output 74 of retracted photocell amplifier 60.

Extended photocell amplifier 83 is connected to sensor 34, which gives a signal in coaction with aperture 35, as has been previously explained, when the fixed message document 9 is extended from cylinders 11. This resets flip-flop 81.

Photo sensor 34 is typically a duplicate of photo sensor 33, previously described. Amplifier 83 may be a duplicate of amplifier 60, save that an additional inverter 85 is added in tandem to provide a reversal of phase.

The Q output of flip-flop 81 is connected to OR gate 86, and therethrough to the first terminal of the D state counter. It is effective in starting the counter.

The $\bar{Q}$ output of flip-flop 81 is connected to the CK terminal of flip-flop 87, which is the initial part of the "reset reverse command" entity 88. Flip-flop 81 has been reset, to plus 5 volts, by photo sensor 34 and amplifier 83 when the fixed message document is fully extended. The Q output of flip-flop 63 is connected to the D terminal of flip-flop 87.

The second part of entity 88 is J-K flip-flop 89. The Q terminal of flip-flop 87 is connected to the J terminal of flip-flop 89, and the $\bar{Q}$ terminal of 87 is connected to the K terminal of 89.

The Q output of flip-flop 89 enters OR gate 90, and therethrough to the third terminal of the D state counter. This simulates a flip switch signal, which reverses how the belts 10 transverse the table of the host document camera system, and allows the fixed message document to reach the correct position for photographing.

The $\bar{Q}$ output of flip-flop 89 enters OR gate 91, along with a RESET input. The output from gate 91 is connected to the R, reset, terminal of flip-flop 87.

Additionally, the Q output of flip-flop 63 is connected to OR gate 92, and therethrough to the fifth terminal of D state counter 65. This simulates that the fixed message document is the second side of a (usual) document, so that the D state counter will process the document accordingly.

The whole reset reverse command entity 88 that has just been detailed accomplishes reversing the belts 10 for accurately positioning the fixed message document for photographing.

D-CK flip-flop 93 comprises a reset entity for the clutch energize command flip-flop 58 and the brake deenergize command flip-flop 67. The D input of 93 is connected to the Q output of start D counter flip-flop 63, and thus is enabled to be energized in common with that part of the overall logic. The CK input of 93 is connected to external terminal 94 through OR gate 98 that is connected as a buffer. An interference bypass capacitor 97 is also included. Both elements 97 and 98 prevent spurious noise signals entering the CK input of flip-flop 93.

Terminal 94 receives a pulse from the logic of the host camera system that signifies the completion of the camera exposure of the individual fixed message document frame.

The Q output from flip-flop 93 is connected to the K inputs of both flip-flops 58 and 67. This resets both of these flip-flops. It is to be noted that retracted amplifier 60 and sensor 33 still maintain clutch 19 energized until the completion of the cycle. Also, brake 22 is held deenergized by the same retracted amplifier 60 and sensor 33 until the completion of the cycle.

The Q output from flip-flop 93 is also connected to both inputs of OR gate 95, the output of which is terminal 96. This terminal is externally connected to the logic of the host document camera system to provide an output when the cycle of the fixed message carrier apparatus is completed.

OR gate 99 receives an input from the $\bar{Q}$ output of clutch flip-flop 58, and another input from terminal 100. The output of gate 99 is connected to the reset of flip-flop 93 to reset it to a quiescent condition. This output is no longer needed after the fixed message document has been exposed. Input 100 is a busy signal that disables flip-flop 93 until the host document camera is not busy.

OR gates 64, 86, 90, 92 and 101 each have one input that is merely a dotted line. The dotted line signifies an existing connection from other logic (not shown) in the host document camera system. With this OR circuit arrangement the host camera system can be utilized independently of coaction with the fixed message carrier attachment, which is necessary, of course.

There has been described a fixed message carrier apparatus for attachment to a document camera system. The latter has logic means 31 required to operate the system, and also document transport means 10.

The attachment apparatus has a fixed message carrier transport, elements 11 and 14, also logic control means 40 that activates the transport to move a fixed message carrier document 9 from a home position upon message carrier 11, 14, to a particular position upon the document transport means 10. This is to accomplish photographing or an equivalent function. Thereafter, the fixed message carrier document is moved back to the home position.

The position of the fixed message document is sensed by position sensor means 33 and/or 34, which provide such information to logic control means 40.

Electrical connection is made between the document camera system logic means 31 and the logic control means 40 by interface inter-connection means 41.

The electrical command to move the fixed message carrier document from the home position to the photographing position, and vice versa, originates in the document camera system logic means 31.

We claim:

1. A fixed message carrier apparatus for a document camera system, which system has system-operating logic means (31) and document transport means (10), comprising;
    (a) a fixed message carrier transport (11, 14),
    (b) control means (40) to reversibly move a fixed message carrier document (9)
    from a home position upon said carrier transport toward and away from a photographing position upon said document transport means (10),
    (c) position sensor means (33 &/or 34) attached to said fixed message transport and connected to said control means to sense the position of said fixed message document, and
    (d) inter-connection means (41) connecting said document camera system logic means (31) to said control means (40)
    to enable reversible movement of said fixed message carrier document from said home position toward said photographing position upon command from said system-operating logic means (31).

2. The fixed message carrier apparatus of claim 1, in which said control means (40) comprises;
    (a) gate means (52) to accept control signals from said inter-connection means (41), as to commands from, and the status of, system-operating logic means (31),
    (b) an electrical sensor channel (60 &/or 83) connected to said position sensor means (33 &/or 34),
    (c) plural further gate means (61, 78) to each accept inputs from said gate means and said sensor channel, (d) a first output circuit (62) from one said further gate means connected to clutch means (19) to move said fixed message carrier document (9), and (e) a second output circuit (79) from another said further gate means connected to brake means (22) to stop the motion of said fixed message carrier document (9).

3. The fixed message carrier apparatus of claim 2, which additionally includes;

(a) plural logic elements (63, 81, 89) in said control means (40), (b) counter means (65) in said system-operating logic means (31), and (c) a connection from each said logic element to said counter means, to simulate electrical responses in said system-operating logic means for accomplishing manipulation of said fixed message document (9) upon said document transport means (10).

4. The fixed message carrier apparatus of claim 2, which additionally includes;

(a) time delay means (59) interposed between said gate means (52) and that said further gate means (61)

that is effective in delaying the electrical response of said first output circuit (62).

5. The fixed message carrier apparatus of claim 1, in which said fixed message carrier transport comprises;

(a) plural cylindrical means (11) concentrically disposed to accept the fixed message document, (b) plural flexible belt means (14) disposed peripherally of each said plural cylindrical means, (c) further plural cylindrical means (16) engaging said plural flexible belt means to drive the same, (d) clutch means (19) to engage at least one said further plural cylindrical means to the document transport means (10) of said document camera system, (e) mechanical (23) and electrical (41) connections from said document camera system to said clutch means for selectively energizing said clutch means to move said fixed message document toward and away from said photographing position, and (f) brake means (22) to engage at least one said further plural cylindrical means to stop the motion of said fixed message carrier transport.

6. The fixed message carrier apparatus of claim 5, which additionally comprises;

(a) plural pairs of stationary guides (38) shaped to partially guide the fixed message carrier document (9) when it is accepted by said cylindrical means (11), said stationary guides spaced axially one from the other and from said cylindrical means, and having an aligned tangentially-disposed slot (39) formed by the juxtaposition of the parts of the pair, to direct said fixed message carrier document from a cylindrical shape to a flat shape in passing from said cylindrical means to the transport means (10) of said document camera system.

7. The fixed message carrier apparatus of claim 5, which additionally comprises;

(a) at least one edge sensor (33 or 34) stationarily disposed adjacent to one of said plural cylindrical means, and (b) a fixed message document (9) having at least one sensor-actuating element (36 or 35) positioned to coact with a said edge sensor when said document assumes a particular position.

8. The fixed message carrier apparatus of claim 7, which additionally includes;

(a) a second edge sensor (34) spaced from said one edge sensor (33), and (b) a second sensor-actuating element (35) spaced from said one sensor-actuating element (36), said second sensor-actuating element (35) disposed to the rear of the fixed message document (9) as it is unwound from said plural cylindrical means (11)

to actuate said second edge sensor (34) to signal said document camera system-operating logic means (31) that said fixed message document is available, and said one edge sensor-actuating element (36) is disposed forwardly upon said fixed message document, upon rewind of said fixed message document, to actuate said one edge sensor (33), to signal said fixed message document transport control means (40), to deenergize said clutch means (19) and energize said brake means (22).

9. The fixed message carrier of claim 8, which additionally includes;

(a) an operative electrical connection (26) from said one edge sensor (33) to said control means (40), to inhibit deenergization of said clutch means (19) and energization of said brake means (22) when said fixed message document (9) is extended from said fixed message carrier apparatus.

10. The fixed message carrier of claim 7, in which;

(a) said edge sensor (33 or 34) is opto-photoelectric, and (b) said sensor-actuating element is an aperture (36 or 35) in an opaque area of said fixed message document (9).

11. The fixed message carrier apparatus of claim 5, in which said fixed message document includes;

(a) plural parallel linear slots (32) through said fixed message document, each terminating, in alignment, at a margin of the text thereof, to allow air to flow through said slots when said fixed message document is upon the document transport means (10) of said document camera system, thereby to manipulatively characterize said fixed message document as a document that has been fed through said document camera system.

12. The fixed message carrier apparatus of claim 5, in which;

(a) said furthe. plural cylindrical means (16, 17, 18) are peripherally disposed with respect to said plural cylindrical means (11), so as to wrap said plural belts (14, 15) partially around the circumference of said plural cylindrical means.

* * * * *